United States Patent [19]

Gregg et al.

[11] Patent Number: 5,410,132
[45] Date of Patent: Apr. 25, 1995

[54] SUPERPLASTIC FORMING USING INDUCTION HEATING

[75] Inventors: Paul S. Gregg; Marc R. Matsen, both of Seattle, Wash.

[73] Assignee: The Boeing Company, Seattle, Wash.

[21] Appl. No.: 777,739

[22] Filed: Oct. 15, 1991

[51] Int. Cl.6 .......................................... B23P 17/00
[52] U.S. Cl. .................................. 219/604; 219/602; 219/600
[58] Field of Search ............. 219/10.73, 10.41, 10.491, 219/604, 603, 635, 621, 600, 645, 647, 649; 72/54, 60, 38, 709, 342; 228/157, 265

[56] References Cited

U.S. PATENT DOCUMENTS

| | | | |
|---|---|---|---|
| 3,340,101 | 9/1967 | Fields, Jr. et al. | 148/11.5 |
| 3,444,275 | 5/1969 | Willett | 219/10.41 |
| 3,466,726 | 9/1969 | Savolainen | 29/157.3 |
| 3,529,458 | 9/1970 | Butler et al. | 72/60 |
| 3,547,751 | 12/1970 | Morgan | 161/68 |
| 3,595,060 | 7/1971 | Hundy | 72/364 |
| 3,605,477 | 9/1971 | Carlson | 72/342 |
| 3,890,819 | 6/1975 | DeLuca | 72/57 |
| 3,895,436 | 7/1975 | Summers et al. | 228/157 |
| 3,920,175 | 11/1975 | Hamilton et al. | 72/60 |
| 3,924,793 | 12/1975 | Summers et al. | 228/157 |
| 3,927,817 | 12/1975 | Hamilton et al. | 228/157 |
| 3,934,441 | 1/1976 | Hamilton et al. | 72/60 |
| 3,974,673 | 8/1976 | Fosness et al. | 72/38 |
| 3,996,019 | 12/1976 | Cogan | 29/191.4 |
| 4,111,024 | 9/1978 | Dahlman et al. | 72/60 |
| 4,141,484 | 2/1979 | Hamilton et al. | 228/265 |
| 4,145,903 | 3/1979 | Leach et al. | 72/60 |
| 4,188,811 | 2/1980 | Brimm | 72/63 |
| 4,217,397 | 8/1980 | Hayase et al. | 228/157 |
| 4,233,829 | 11/1980 | Hamilton et al. | 72/38 |
| 4,233,831 | 11/1980 | Hamilton et al. | 72/60 |
| 4,263,375 | 4/1981 | Elrod | 428/594 |
| 4,269,053 | 5/1981 | Agrawal et al. | 72/42 |
| 4,304,821 | 12/1981 | Hayase et al. | 428/593 |
| 4,306,436 | 12/1981 | Schulz et al. | 228/157 |
| 4,331,284 | 5/1982 | Schulz et al. | 228/157 |
| 4,351,470 | 9/1982 | Swadling et al. | 228/157 |
| 4,352,280 | 10/1982 | Ghosh | 72/38 |
| 4,354,369 | 10/1982 | Hamilton | 72/38 |
| 4,361,262 | 11/1982 | Israeli | 228/118 |
| 4,426,032 | 1/1984 | Leodolter | 228/157 |
| 4,474,044 | 10/1984 | Leistner et al. | 72/60 |
| 4,563,145 | 1/1986 | de Meij | 249/78 |
| 4,584,860 | 4/1986 | Leonard | 72/61 |
| 4,603,089 | 7/1986 | Bampton | 428/593 |
| 4,603,808 | 8/1986 | Stacher | 228/265 |
| 4,622,445 | 11/1986 | Matsen | 219/10.41 |
| 4,657,717 | 4/1987 | Cattanach et al. | 264/10.2 |
| 4,713,953 | 12/1987 | Yavari | 72/60 |
| 4,888,973 | 12/1989 | Comley | 72/342 |
| 464,889,276 | 12/1989 | Cadwell et al. | 228/265 |
| 4,901,552 | 2/1990 | Ginty et al. | 72/60 |
| 4,984,348 | 1/1991 | Cadwell | 72/60 |
| 4,988,037 | 1/1991 | Cadwell | 228/265 |
| 5,047,605 | 9/1991 | Ogden | 219/10.41 |
| 5,118,026 | 6/1992 | Stacher | 228/157 |

FOREIGN PATENT DOCUMENTS

1418327 12/1975 United Kingdom ........ B21D 35/00

OTHER PUBLICATIONS

Border, J. and R. Salas, "Induction Heated Joining of Thermoplastic Composites Without Metal Susceptors," *34th International SAMPE Symposium*, May 8–11, 1989, pp. 2569–2578.

Sumida, A., K. Ono, and Y. Kawazu, "Pan Based High Modulus Graphitized Carbon Fiber Torayca M60J", *34th International SAMPE Symposium*, May 8–11, 1989, pp. 2579–2589.

*Primary Examiner*—Geoffrey S. Evans
*Assistant Examiner*—Tu Hoang
*Attorney, Agent, or Firm*—Christensen; O'Connor, Johnson & Kindness

[57] ABSTRACT

Apparatus and method for superplastic forming. The workpiece is held between a pair of dies that are electrically and thermally nonconductive, and is heated inductively by a coil embedded within the dies.

27 Claims, 4 Drawing Sheets

SUPERPLASTIC FORMING USING INDUCTION HEATING

FIELD OF THE INVENTION

The present invention relates to superplastic forming of workpieces.

BACKGROUND OF THE INVENTION

Under certain conditions, some materials can be plastically deformed without rupture well beyond their normal limits, a property called superplasticity. This property is exhibited by certain metals and alloys, within limited ranges of temperature and strain rate. For example, titanium and its alloys are superplastic in the temperature range 1450°–1850° F.

Superplastic forming (SPF) is a fabrication technique that relies on superplasticity. A typical SPF process involves placing a sheet of metal in a die, heating the sheet to an elevated temperature at which it exhibits superplasticity, and then using a gas to apply pressure to one side of the sheet. The pressure stretches the sheet and causes it to assume the shape of the die surface. The pressure is selected to strain the material at a strain rate that is within its superplasticity range at the elevated temperature.

One advantage of SPF is that very complex shapes can be readily formed. In addition, the SPF process is generally applicable to single and multi-sheet fabrication, and can be combined with joining processes such as diffusion bonding to produce complex sandwich structures at a relatively low cost. The simplicity of the SPF process leads to lighter and less expensive parts with fewer fasteners, and higher potential geometric complexity. Common applications of SPF include the manufacturing of parts for aircraft, missiles and space vehicles.

In a typical prior art SPF process for titanium, a titanium sheet is placed between steel dies, one of which has a contoured surface corresponding to the shape to be imparted to the titanium sheet. The dies are then placed on platens or plates which are heated through the use of electrical resistance type heating elements embedded within the platens. The platens heat the dies through conduction heating to about 1650° F. To avoid oxidation of the titanium at the elevated temperature, the sheet is immersed in an inert atmosphere such as argon gas. The dies conduct heat into the titanium until its temperature reaches the superplastic range. At that time, the pressure of the argon gas on the side of the sheet away from the contoured surface is elevated sufficiently to deform the titanium sheet against the contoured surface, whereupon the sheet acquires the shape of the surface.

The high temperature at which the SPF operation must be carried out causes it to be a slow and cumbersome process. In particular, because of their large thermal mass, the dies are typically maintained at forming temperature throughout a production run. Failure to maintain the dies at superplastic forming temperatures during part loading and unloading would result in unacceptable process times for each part. Thus, blank sheets must be inserted, and formed parts removed, while the SPF dies are at forming temperature. Because the parts are loaded and unloaded from the dies while still at forming temperature, the parts must be very carefully handled in order to minimize bending of the part. Even with careful handling, some parts may be distorted during unloading and require subsequent processing steps to achieve proper part tolerances. Furthermore, the elevated temperature of the forming dies and parts requires operators to wear protective clothing and use special equipment to insert the metal sheets between the dies, and particularly to remove the formed parts.

SUMMARY OF THE INVENTION

The present invention provides an improved apparatus and method for superplastic forming.

A preferred apparatus according to the invention comprises a die having a nonmetallic forming surface that has a shape corresponding to the desired shape for the workpiece. Means are provided for positioning the workpiece such that it overlies the forming surface, with a first side of the workpiece facing the forming surface. Inductive heating means are provided for subjecting the workpiece to a time varying magnetic field, such that the workpiece is heated to a temperature at which it is superplastic. Finally, means are provided for producing a pressure differential between the first and second sides of the workpiece, while the workpiece is at said temperature, such that the workpiece deforms and assumes the shape of the forming surface. The dies are preferably formed from a dielectric, thermally insulating material such as a castable ceramic. Thermal energy is therefore applied to the workpiece but not the dies, leading to much shorter heating and cooling cycles as compared to the prior art technique of using resistance-type heating with metal dies. The inductive heating means of the invention preferably comprises a plurality of electrical conductors embedded within the dies, and means for interconnecting such conductors into a coil that surrounds the workpiece.

DETAILED DESCRIPTION OF THE PREFERRED EMBODIMENTS

Figure 1:
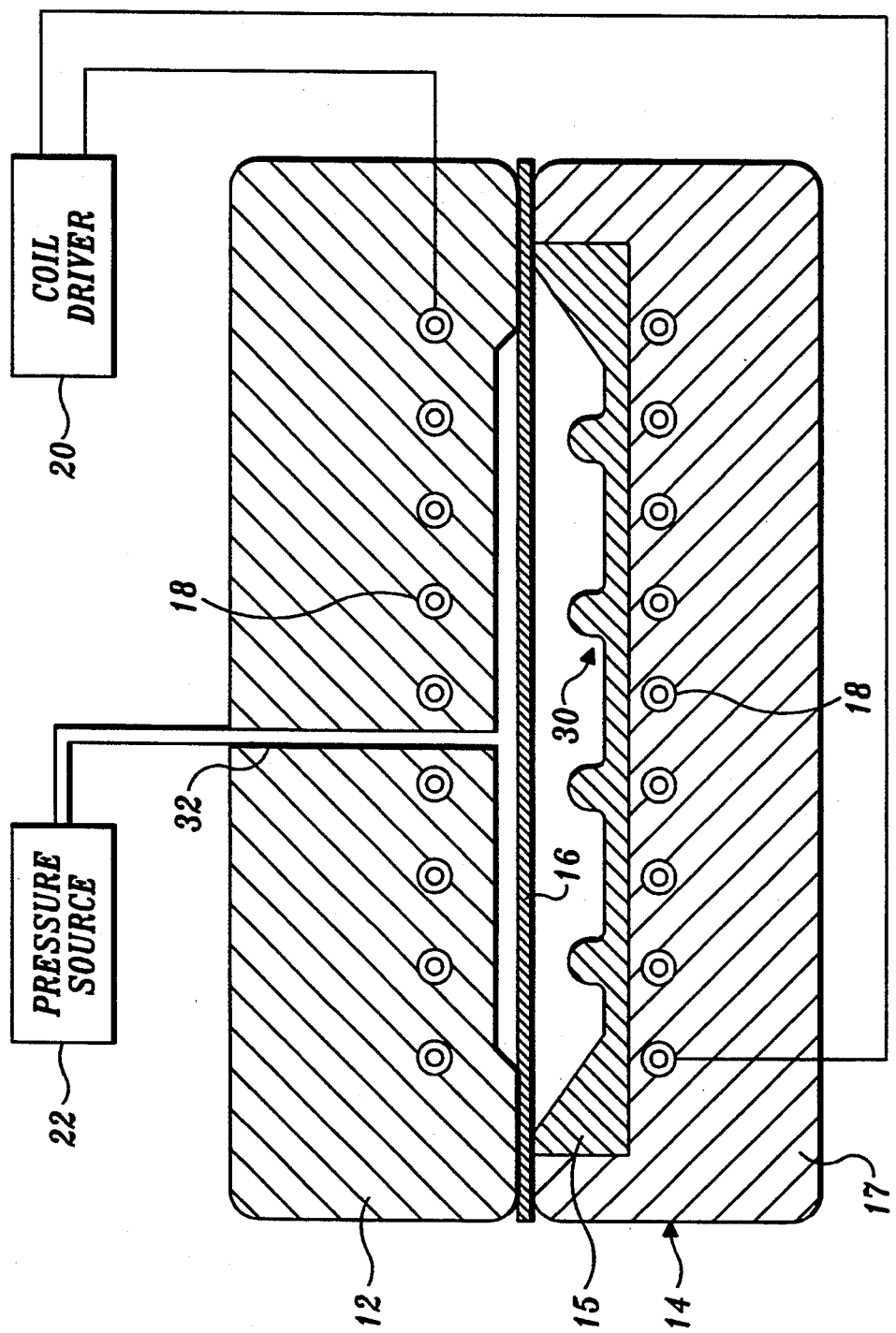
FIG. 1 is a schematic diagram of an apparatus for performing superplastic forming according to the present invention.

FIG. 1 schematically illustrates a preferred embodiment of a superplastic forming apparatus according to the present invention. The apparatus includes a pair of dies 12 and 14 between which a workpiece 16 may be positioned. Both dies are preferably formed from a dielectric, thermally insulating material, such as ceramic. A plurality of metallic tubing sections 18 are embedded within the upper and lower dies, and interconnected to one another to form a single coil, as further described below. The apparatus also includes coil driver 20 connected to two of the tubing sections 18, and pressure source 22. The apparatus may also include means (not shown) for pumping a cooling fluid through tubing sections 18.

Lower die 14 includes a tool box 17 and a tool insert 15. The tool insert 15 has a forming surface 30 that has a shape corresponding to the desired shape for workpiece 16. The tool insert 15 and tool box 17 are preferably formed from a dielectric, thermally insulating material such as ceramic. Tool insert 15 and tool box 17 can be separate pieces as shown in FIG. 1 or they can be a single integral part. The two piece design shown in FIG. 1 reduces cost by allowing different tool inserts 15 to be interchangeably used within the tool box 17.

Figure 2:
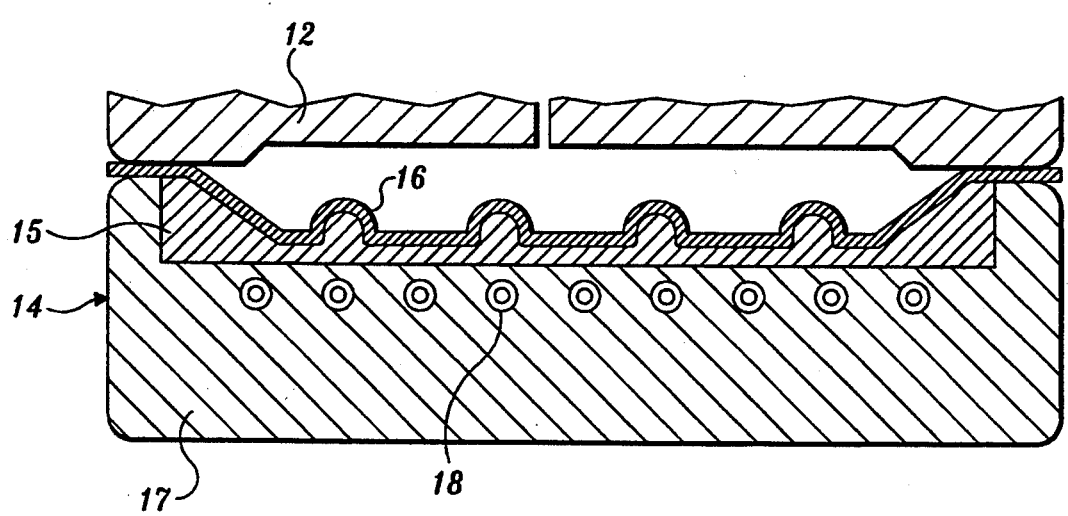
FIG. 2 is a schematic view illustrating the deformation of the workpiece.

In operation, coil driver 20 energizes the coil formed by sections 18, such that workpiece 16 is inductively heated. When the workpiece reaches a temperature at which it is superplastic, pressure is applied to the upper surface of the workpiece from pressure source 22 via conduit 32 that passes through upper die 12. Suitable pressures vary depending upon the workpiece, with pressures in the range 50-600 psi being typical. In response to the pressure, the workpiece deforms until it assumes the shape of forming surface 30, as illustrated in FIG. 2. Small pinholes (not shown) may be formed in the tool insert 15 and tool box 17 to allow the venting of gas trapped between the workpiece and the forming surface as deformation proceeds. Such pinholes are often coupled to a flow meter to monitor the progress of deformation. When the workpiece has the desired shape, the coil is de-energized, and the pressure source removed. The dies may then be separated to remove the formed workpiece.

One of the key concepts of the present invention is the use of inductive rather than resistive heating to heat the workpiece. Inductive heating is accomplished by applying an alternating electrical current to the coil within which the workpiece is positioned, to thereby produce an alternating magnetic field in the vicinity of the coil. The alternating magnetic field heats the metallic workpiece via eddy current heating. However the dies are constructed from a dielectric material that is not heated by the time varying magnetic field. Furthermore, the material from which the dies are constructed is also thermally insulating, so that it traps and contains the heat transferred to the workpiece. Other desirable properties for the dies are a low coefficient of thermal expansion, good thermal shock resistance, and relatively high compressive strength. The preferred die materials are castable ceramics, and particularly fused silica castable ceramics.

Figure 3:
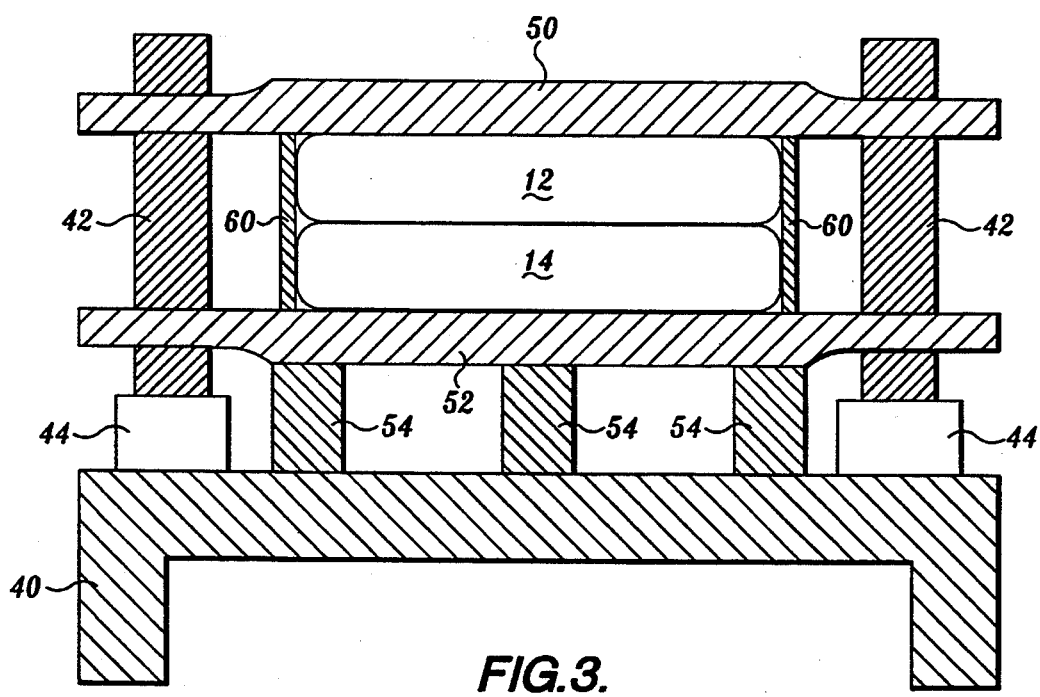
FIG. 3 is a schematic view illustrating the support for the dies.

FIG. 3 illustrates a suitable support structure for the apparatus shown in FIGS. 1 and 2. The support structure includes base 40 from which threaded shafts 42 extend upwardly from gear boxes 44 which rotate the threaded shafts 42. Dies 12 and 14 are supported above and below by metal strongbacks 50 and 52, respectively. Strongback 52 loosely receives shafts 42, and rests upon reinforcing bars 54. Upper strongback 50 is threadably supported on shafts 42, such that the position of upper strongback 50 can be varied vertically by rotation of the shafts, to thereby open or close the dies. Each strongback consists of a metal structure whose purpose is to provide a stiff, flat surface backing the ceramic die, to transfer the load between the die and the support structure. The strongback must be flat and stiff enough to prevent the ceramic die from bending and cracking. Preferably, the strongback should be capable of holding the ceramic die to a surface tolerance of ±0.003 inches per square foot of die surface. Because relatively little of the magnetic field is produced outside the coil, the strongback remains substantially at room temperature during the SPF process, despite its metallic construction.

Dies 12 and 14 are supported laterally by box 60 that encloses the dies on all sides. Box 60 is preferably formed from a dielectric material, so that it will not be heated by any inductive field that extends outside the dies. A suitable material for box 60 is a phenolic resin. The phenolic box may further be connected with preloaded tie rods, in a manner similar to prestressed concrete, or an external load fixture may be used to push against the phenolic box. Utilizing either method, the phenolic box sides function as pressure plates that maintain compressive forces on the ceramic dies. When the dies are formed from a castable ceramic material, the phenolic box may also provide the sidewalls of the mold for casting the dies.

Figure 4:
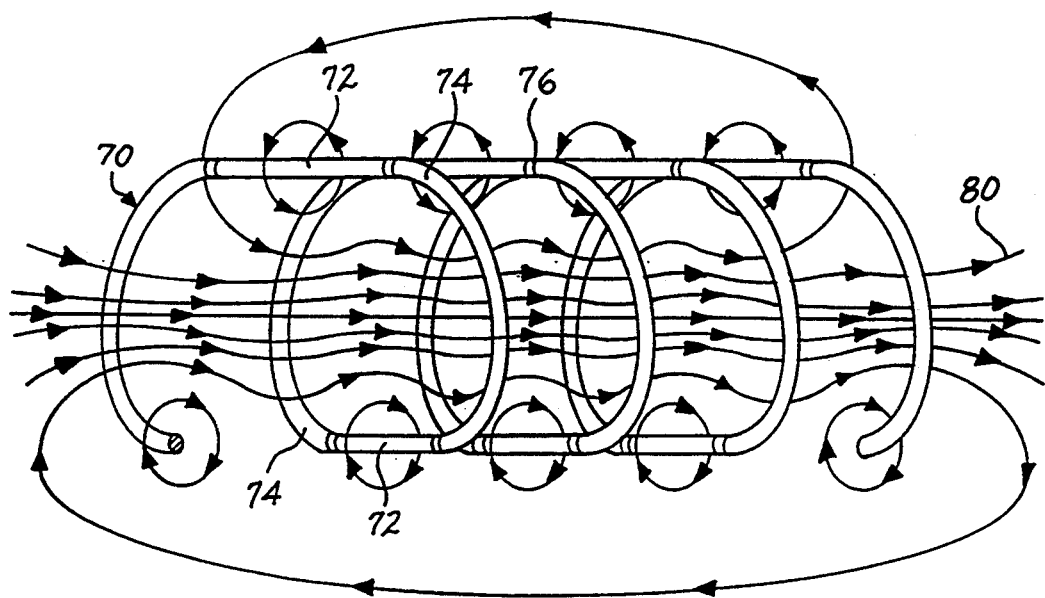
FIG. 4 is a perspective view illustrating the induction coil.
Figure 5:
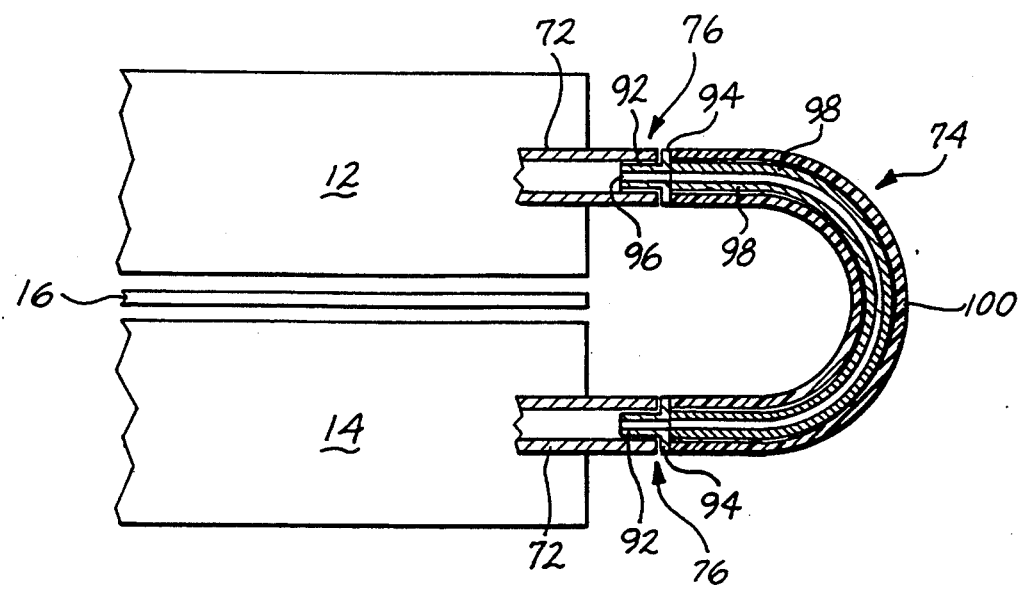
FIG. 5 is a cross-sectional view of a flexible coil connector.

FIGS. 4 and 5 illustrate a preferred method for interconnecting tubing sections 18 (FIG. 1) into a single coil. Referring initially to FIG. 4, coil 70 comprises straight sections 72 and curved sections 74. Each straight section 72 is cast into one of the dies, while each curved section 74 extends between the upper and lower die, as illustrated in FIG. 5. The curved sections are flexible, as further described below, to accommodate the opening and closing of the dies. The curved and straight sections are joined at fittings 76 into a continuous coil or helix structure, producing a magnetic field schematically illustrated by field lines 80 in FIG. 4. By applying a time varying current to coil 70, a time varying magnetic field 80 is created that heats the metal workpiece via eddy current heating. Each straight section 72 and curved section 74 preferably comprises a copper tube having an interior longitudinal passage through which a cooling fluid such as water may be pumped to cool the tubing sections themselves.

FIG. 5 illustrates a preferred construction for curved section 74. The curved section comprises a pair of fittings 76, each of which contains a relatively small diameter section 92 dimensioned so as to fit snugly within straight section 72, and a larger diameter flange 94. Passages 96 extend through the fittings, including the flange. A pair of flexible copper strips 98 are joined between flanges 94, such as by brazing. Finally, a flexible jacket 100 is secured over the copper strips between the flanges to contain the cooling fluid. The jacket preferably comprises a flexible, non-conducting material capable of holding (for example) 80 psi at 140° F. A suitable design utilizes four copper strips approximately five inches long, 0.75 inches wide, and 0.03 inches thick. Such a connection can accommodate three inches of travel between the dies. One commercial vendor through which a suitable design can be obtained is Flex-Cable.

The frequency at which the coil driver drives the coil depends upon the nature of the workpiece. Current penetration of copper at 3 KHz is approximately 0.06 inches, while the penetration at 10 KHz is approximately 0.03 inches. The shape of the coil used to create the induction heating has a significant effect upon the magnetic field uniformity. This in turn is important because temperature uniformity is directly affected by the uniformity of the magnetic field. Uniform heating in turn means that different portions of the workpiece will reach the appropriate temperature for superplastic forming at the same time. Solenoidal type coils provide such a uniform field, and are therefore preferred.

Greater field uniformity is seen by a part which is symmetric about the centerline of the coil. The additions of variations, such as series/parallel coil combinations, variable turn spacings and distances between the part and the coil can be established by standard electrical calculations.

Figure 6:
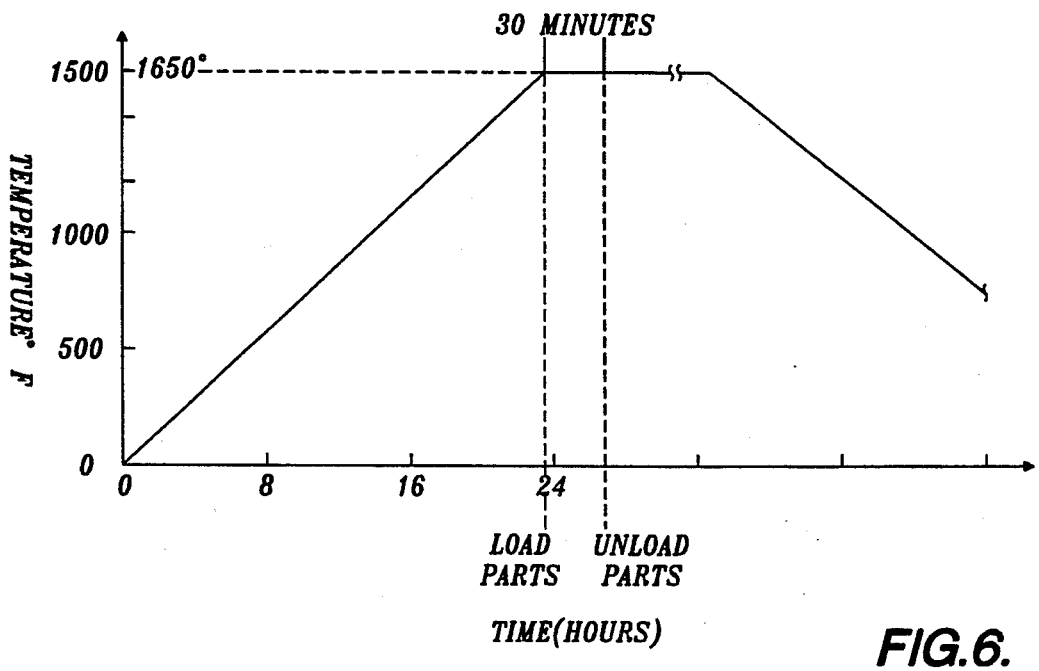
FIG. 6 is a graph illustrating the thermal cycle for SPF with prior art resistive type heating.
Figure 7:
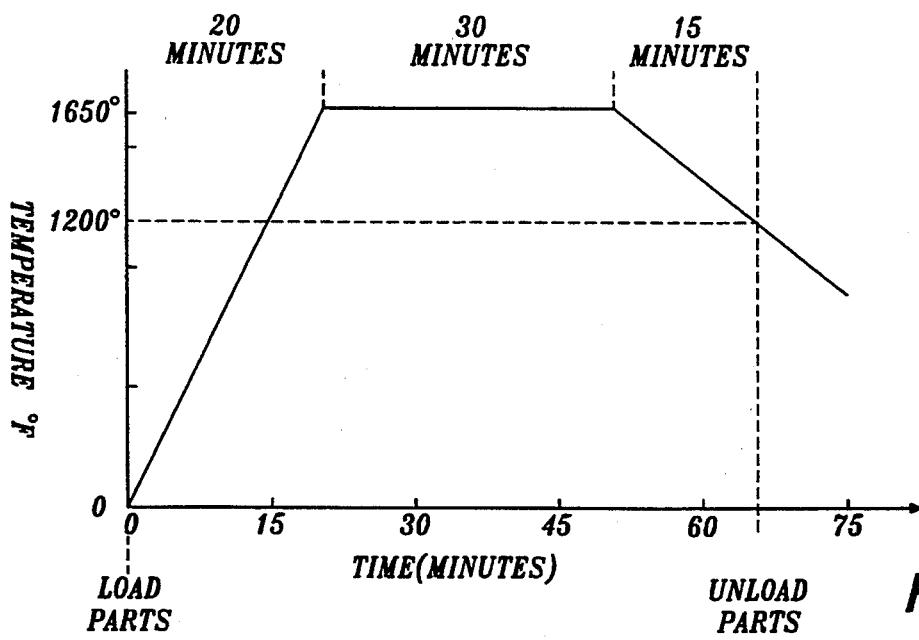
FIG. 7 is a graph illustrating the thermal cycle for SPF utilizing the present invention.

Some advantages of the invention are illustrated by the graphs shown in FIGS. 6 and 7. FIG. 6 illustrates a typical SPF cycle using the prior art technique of resistance heating of the metallic workpiece and dies. The dies are heated to superplastic forming temperatures starting at time 0. Because of the large thermal mass of the thermally conductive metallic dies used in the prior art, the superplastic forming temperature (here 1650° F.) is not attained until about 23 hours later. The workpiece is then loaded into the dies and the superplastic forming operation is carried out, for 30 minutes in this example.

Because of the large times that would be necessary for the metallic dies to cool, the workpiece is removed from the dies while the dies are still at operating temperature. Because the workpiece is still at superplastic forming temperatures, the part must be very carefully unloaded to minimize bending or distortion of the hot part. Even careful removal can result in some distortion of the formed part which must then be further processed in order to obtain proper part tolerances. This increases the costs and complexities in manufacturing.

After removing the workpiece from the dies, a new workpiece may be inserted and superplasticly formed. Upon completion of the production cycle, the metallic dies are then cooled. Because of the large thermal mass of the thermally conductive metallic dies, this cooling process takes a substantial amount of time. During the heating and cooling of the metallic dies used in the prior art, no superplastic forming can take place; therefore, the facility has a large amount of downtime where it is not producing parts.

FIG. 7 provides a comparable graph for the technique of the present invention. Using the invention, a workpiece temperature of 1650° F. may be reached in about 20 minutes, and the workpiece may be formed in about 30 minutes and cooled to 1200° F. in about 15 minutes. Thus the total cycle time is only slightly greater than the one hour. This much shorter time is due to the fact that the workpiece has a much lower thermal mass than the metallic dies used in the prior art. The reduced cycle times of the present invention reduce the downtime involved in a part run.

Because of the short amount of time required to heat and cool the dies used in the present invention, the workpiece temperature can be reduced to approximately 1200° F., without adding significant downtime, before removing the workpiece from the dies. This allows the workpiece to cool to a temperature below the superplastic forming temperature, which reduces the risk of part distortion or damage during the unloading operation.

While the invention has been described in connection with the forming of a single sheet workpiece, it would readily be apparent to those skilled in the art that the process could readily be extended to workpieces that comprise multiple sheets. Generally, in such processes, the gas pressure is applied between pairs of sheets to produce multi-layer structures such as rib-stiffened or truss core fuselage structures, stability critical aerosurfaces, beaded shear webs, inlet structures, and other complex shape assemblies. For all such structures, the use of the SPF processes of the present invention will significantly reduce process steps, part counts, and fasteners, resulting in decreased cost, higher reliability, and reduced weight.

Non-metallic materials which are electrically conductive can also be used with the apparatus of the present invention. These materials include composites that contain an electrically conductive material, e.g., graphite fibers. The induction heating process of the present invention induces currents in the electrically conductive fibers within the composite material which result in heating of the fibers and subsequent heating of the entire workpiece.

It will also be apparent to those skilled in the art that the workpiece itself need not comprise a metal or other electrically conductive material. For example, if the workpiece is not conductive, it may be placed in a contact with or bonded to a conductive heating plate that absorbs heat from the inductive field, and transfers it to the workpiece material.

The embodiments of the invention in which an exclusive property or privilege is claimed are defined as follows:

1. An apparatus for superplastic forming a workpiece susceptible to inductive heating, the apparatus comprising:
   a die formed of a material substantially transparent to the transmission of an inductive magnetic field, the die having a forming surface that has a shape corresponding to a desired shape for a workpiece having a first side and a second side, the die being adapted to hold the workpiece in an overlying relationship with the forming surface with the first side facing the forming surface; and
   means for superplastic forming the workpiece into the shape of the forming surface, the means for superplastic forming including an inductive heater that directly subjects the workpiece to an alternating magnetic field until the workpiece is heated to a temperature at which it is superplastic.

2. The apparatus of claim 1, further comprising a second die positioned of the second side of the workpiece.

3. The apparatus of claim 2, wherein the dies are formed from a dielectric, thermally insulating material.

4. The apparatus of claim 2, wherein the inductive comprises an electrical conductor embedded within at least one of the dies.

5. The apparatus of claim 4, wherein the inductive comprises a plurality of conductors embedded within each die, and means for interconnecting said plurality of connectors into a single electrically conductive coil surrounding the workpiece.

6. The apparatus of claim 5, wherein the means for interconnecting comprises a pair of connectors for connecting the means for interconnecting to the conductors embedded within the dies, and one or more flexible metallic members extending between the connectors.

7. The apparatus of claim 6, wherein said conductors embedded within the dies include conduits adapted to carry a cooling fluid, and wherein the means for interconnecting comprises a flexible electrically insulating jacket for containing the cooling fluid.

8. The apparatus of claim 3, wherein the dies comprise a castable, fused silica ceramic material.

9. The apparatus of claim 8, further comprising a lateral support structure surrounding the dies and workpiece, the lateral support structure comprising a dielectric material.

10. The apparatus of claim 1, wherein the die further comprises a tool insert that includes said forming surface and a tool box for holding the tool insert.

11. The apparatus of claim 1, wherein the workpiece comprises a metal.

12. The apparatus of claim 1, wherein the workpiece comprises a composite that includes an electrically conductive material.

13. A method for superplastic forming a workpiece susceptible to inductive heating, and having first and second sides, the method comprising:
   positioning the workpiece in an overlying relationship with a die formed of a material substantially transparent to the transmission of an inductive magnetic field and having a non-metallic forming surface that has a shape corresponding to a desired shape for the workpiece;
   inductively heating the workpiece by directly subjecting the workpiece to a time-varying magnetic field produced through the use of an alternating electrical current until the workpiece is heated to a temperature at which it is superplastic; and
   superplastic forming the workpiece into the shape of the forming surface.

14. The apparatus of claim 1, wherein the means for superplastic forming comprises means for producing a pressure differential between the first and second sides of the workpiece while the workpiece is at said temperature, said pressure differential causing the workpiece to deform and assume the shape of the forming surface.

15. The apparatus of claim 1, wherein the workpiece is formed of a titanium alloy.

16. The apparatus of claim 1, wherein the workpiece comprises a heating plate susceptible to inductive heating adjacent to the workpiece that is to be superplastically formed.

17. The method of claim 13, wherein the superplastic forming step further comprises the step of producing a pressure differential between the first and second sides of the workpiece, while the workpiece is at said temperature, said pressure differential causing the workpiece to deform and assume the shape of the forming surface.

18. The method of claim 13, wherein the workpiece is selected from the group consisting of titanium or titanium alloys.

19. A method for superplastic forming a workpiece susceptible to inductive heating, comprising the steps of:
   (a) directly inductively heating the workpiece to its superplastic forming temperature range by subjecting the workpiece to a time-varying magnetic field produced by an alternating electrical current;
   (b) superplastic forming the workpiece, while maintaining the temperature of the workpiece within the superplastic forming temperature range; and
   (c) at least partially cooling the workpiece by stopping the use of the inductive heating.

20. The method of claim 19, wherein the workpiece is selected from the group consisting of titanium or titanium alloys.

21. The method of claim 19, wherein the workpiece comprises a heating plate susceptible to inductive heating adjacent to the workpiece that is to be superplastically formed.

22. A method for superplastic forming a workpiece susceptible to inductive heating, comprising the steps of:
   (a) positioning the workpiece in a ceramic die;
   (b) directly inductively heating the workpiece to a superplastic forming temperature range by subjecting the workpiece to a time-varying magnetic field produced using an alternating electrical current;
   (c) superplastic forming the workpiece while maintaining the temperature of the workpiece in its superplastic forming range;
   (d) stopping the inductive heating after the workpiece is formed to a desired shape;
   (e) cooling the workpiece to a temperature below its superplastic forming range; and
   (f) removing the workpiece from the ceramic die at a temperature below the superplastic forming range.

23. The method of claim 22, wherein the heating step superplastic forming step, stopping step, cooling step, and removing step take place in approximately one hour.

24. The method of claim 22, wherein the superplastic temperature forming range is approximately 1450°–1850° F.

25. The method of claim 22, wherein the removing step takes place when the workpiece is at a temperature of approximately 1200° F.

26. The method of claim 22, wherein the workpiece is selected from a group consisting of titanium or titanium alloys.

27. The method of claim 22, wherein the workpiece comprises a heating plate susceptible to inductive heating adjacent to a structure to be superplastically formed and wherein step (a) further comprises positioning the heating plate and structure in a die.

* * * * *

UNITED STATES PATENT AND TRADEMARK OFFICE
CERTIFICATE OF CORRECTION

PATENT NO. : 5,410,132  Page 1 of 2
DATED : April 25, 1995
INVENTOR(S) : P.S. Gregg et al.

It is certified that error appears in the above-indentified patent and that said Letters Patent is hereby corrected as shown below:

On the title page item,

| | | |
|---|---|---|
| [56] | Refs. Cited | Insert --4,635,461 01/1987 Raymond .... 72/342-- |
| [56] | Refs. Cited | Insert --4,649,249 03/1987 Odor .... 219/10.73-- |
| [56] | Refs. Cited | Insert --4,951,491 08/1990 Lorenz .... 72/60-- |
| [56] | Refs. Cited | "464,889,276" should read --4,889,276-- |
| [57] | Abstract | After "dies." insert --The dies are formed of a material that is not susceptible to inductive heating. This structure allows the workpiece to be positioned within the dies and inductively heated by the coils embedded within the dies without heating the structure of the dies. The dies may also include a tool insert having a forming surface contoured to the desired shape of the completed part. The workpiece is inductively heated to a superplastic forming temperature and is then superplastically formed to the shape of the forming surface.-- |
| Col. 2, lines, 14-15 | | "Means are provided for positioning the workpiece" should read --The workpiece is positioned on the die-- |

UNITED STATES PATENT AND TRADEMARK OFFICE
CERTIFICATE OF CORRECTION

PATENT NO. : 5,410,132
DATED : April 25, 1995
INVENTOR(S) : P.S. Gregg et al.

Page 2 of 2

It is certified that error appears in the above-indentified patent and that said Letters Patent is hereby corrected as shown below:

| COLUMN | LINE | |
|---|---|---|
| 6 (Claim 4, | line 1) | "inductive comprises" should read --inductive heater comprises-- |
| 6 (Claim 5, | line 1) | "inductive comprises" should read --inductive heater comprises-- |

Signed and Sealed this

Twenty-ninth Day of August, 1995

Attest:

BRUCE LEHMAN

*Attesting Officer*   *Commissioner of Patents and Trademarks*